United States Patent [19]
Talsma et al.

[11] 4,224,097
[45] Sep. 23, 1980

[54] SOLVENT BONDING OF HIGH ACRYLONITRILE COPOLYMERS

[75] Inventors: Herbert Talsma, East Cleveland; Charles L. Blanchard, Chagrin Falls; Anita E. Waggy, Ashville, all of Ohio

[73] Assignee: Standard Oil Company, Cleveland, Ohio

[21] Appl. No.: 963,473

[22] Filed: Nov. 24, 1978

[51] Int. Cl.² ............................................. C09J 5/02
[52] U.S. Cl. .............................. 156/307.3; 156/305; 156/326; 156/330; 428/521; 428/522
[58] Field of Search .............. 156/305, 308, 326, 330

[56] References Cited
U.S. PATENT DOCUMENTS

| | | | |
|---|---|---|---|
| 3,236,586 | 2/1966 | Humphreys | 8/130.1 |
| 3,236,587 | 2/1966 | Genereux | 8/130.1 |
| 3,574,523 | 4/1971 | Hudson et al. | 8/130.1 |
| 3,947,527 | 3/1976 | Li et al. | 260/879 |
| 3,950,454 | 4/1976 | Hensley et al. | 260/879 |

FOREIGN PATENT DOCUMENTS 918632  2/1963  United Kingdom .

Primary Examiner—Richard B. Turer
Attorney, Agent, or Firm—John F. Jones; Larry W. Evans

[57] ABSTRACT

A method for bonding high acrylonitrile copolymers to themselves comprises using certain organic solvents, such as an epoxide, as bonding agents.

7 Claims, No Drawings

SOLVENT BONDING OF HIGH ACRYLONITRILE COPOLYMERS

This invention relates to the bonding of high acrylonitrile copolymers to themselves, and more particularly pertains to a method for bonding high acrylonitrile copolymers to themselves without adhesives by means of certain organic solvents.

High acrylonitrile copolymers which may be rubber-modified can be heat sealed by known methods to produce strong bonds which cannot be separated by hand. Heat sealing also requires the use of energy and special heat-sealing apparatus. We have discovered that certain organic liquids can be used to form good bonds between articles of high acrylonitrile copolymers without the need for adhesives or heat sealing.

It is an object of this invention to provide a method for bonding articles such as sheets, films, plaques, etc., of high acrylonitrile copolymers to themselves at room temperature.

Another object is the provision of bonds between articles of high acrylonitrile copolymers which have peel strengths which can be separated by hand.

These and other objects have been accomplished as the following description and exemplary disclosure will show.

The high nitrile copolymers useful in the present invention are those composed of an olefinic nitrile, such as acrylonitrile, another monomer component copolymerizable with the olefinic nitrile, such as methyl acrylate, and optionally a rubber for improvement in impact resistance. High nitrile resins of this type include those previously disclosed in U.S. Pat. Nos. 3,426,102, 3,586,737, 3,763,278, 3,803,264, 3,821,348, 3,839,495, 3,891,722, 3,926,871, 3,926,926, 3,947,527, 3,950,454, and others.

The polymers useful in this invention are those produced by polymerizing a major proportion of a mono-unsaturated nitrile, such as acrylonitrile, and a minor proportion of another monovinyl monomer component copolymerizable with said nitrile, in an aqueous medium optionally in the presence of a diene rubber which may be a homopolymer or a copolymer of a conjugated diene monomer.

The conjugated diene monomers useful in the present invention include butadiene, isoprene, chloroprene, bromoprene, cyanoprene, 2,3-dimethyl-butadiene, 2-ethylbutadiene, 2,3-diethyl-butadiene, and the like, and others. Most preferred for the purposes of this invention are butadiene and isoprene because of their ready availability and their excellent copolymerization properties.

The olefinically unsaturated nitriles useful in this invention are the alpha-beta-olefinically unsaturated mononitriles having the structure

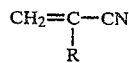

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles are acrylonitrile and methacrylonitrile and mixtures thereof.

The other monovinyl monomer component copolymerizable with the olefinically unsaturated nitriles which are useful in this invention includes one or more of the vinyl aromatic monomers, esters or olefinically unsaturated carboxylic acids, vinyl esters, vinyl ethers, alpha-olefins, indene, and others.

The vinyl aromatic monomers include styrene, alpha-methyl styrene, the vinyl toluenes, the vinyl xylenes, and the like. Most preferred is styrene.

The esters of olefinically unsaturated carboxylic acids include those having the structure

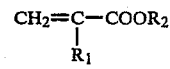

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred are methyl acrylate, ethyl acrylate, methyl methacrylate, and ethyl methacrylate.

The alpha-olefins useful in the present invention are those having at least 4 and as many as 10 carbon atoms having the structure

wherein R' and R" are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers useful in this invention include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

Vinyl esters useful in this invention include vinyl acetate, vinyl propionate, the vinyl butyrates, and the like. Most preferred is vinyl acetate.

The polymers useful in this invention are those prepared by the polymerization of 100 parts by weight of (A) from 60 to 90% by weight of at least one nitrile having the structure

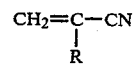

wherein R has the foregoing designation, and (B) from 10 to 40% by weight based on the combined weight of (A) plus (B) of at least one member selected from the group consisting of (1) styrene, (2) an ester having the structure $$CH_2=C-COOR_2$$
$$|$$
$$R_1$$

wherein $R_1$ and $R_2$ have the foregoing designations, (3) an alpha-olefin having the structure $$CH_2=C\begin{matrix}R'\\|\\R''\end{matrix}$$

wherein R' and R" have the foregoing designations, (4) a vinyl ether selected from the group consisting of methyl vinyl ether, ethyl vinyl ether, the propyl vinyl ethers, and the butyl vinyl ethers, (5) vinyl acetate, and (6) indene, in the presence of from 0 to 40 parts by weight of (C) a rubbery polymer of a conjugated diene monomer selected from the group consisting of butadiene and isoprene and optionally at least one comonomer selected from the group consisting of styrene, a nitrile monomer having the structure $$CH_2=C-CN$$
$$|$$
$$R$$

wherein R has the foregoing designation, and an ester having the structure $$CH_2=C-COOR_2$$
$$|$$
$$R_1$$

wherein $R_1$ and $R_2$ have the foregoing designations, said rubbery polymer containing from 50 to 100% by weight of polymerized conjugated diene and from 0 to 50% by weight of comonomer.

The organic liquids useful as bonding agents for bonding the polymer articles of this invention include the following materials: epoxy compounds including ethylene oxide, propylene oxide, 1,2 epoxyethyl benzene, epichlorohydrin, and epibromohydrin; lactones including 4-butyrolactone, 4-valerolactone, and 6-hexanolactone; furoyl compounds including 2-furaldehyde, methyl furylketone, and furfuryl alcohol; and other compounds including oxazole, 1,3-dioxolane, and 3-methoxy propionitrile.

The bonding process of this invention is useful in the fabrication of boxes, flexible and semi-flexible pouches, sealing of thermoformed tubs, bottles, laminates, and other articles from high acrylonitrile copolymers.

This invention is further illustrated in the following examples wherein the amounts of ingredients and other materials are expressed in parts by weight unless otherwise indicated.

EXAMPLE 1

An extruded sheet of a copolymer of 75 parts of acrylonitrile and 25 parts of methyl acrylate prepared in the presence of 10 parts of a rubbery copolymer of butadiene and acrylonitrile according to U.S. Pat. No. 3,426,102 having a thickness of 3 mils was employed. A strip of this sheet having the dimensions 1 inch by 5 inches was coated leaving a 1-inch uncoated surface with the bonding agent indicated in Table 1 below, and another strip of this sheet of the same size was placed on top of the coated surface of the first strip, and the strips were sealed together at room temperature under slight pressure of a spring clamp. The peel strength (strength needed to separate the strips at the sealed joint) was measured on an Instron instrument. A 2-inch-per-minute crosshead speed was used. The results obtained for a number of such samples are given in Table 1.

Table 1

| Bonding Agent | Peel Strength (lbs./in.) |
| --- | --- |
| ethylene oxide | 10.2 |
| propylene oxide | 2.5 |
| 1,2 epoxyethyl benzene | 0.1 |
| epichlorohydrin | 8.9 |
| 4-valerolactone | 10.2 |
| 6-hexanolactone | 8.7 |
| 2-furaldehye | 5.6 |
| methyl furylketone | 3.0 |
| oxazole | 4.5 |
| furfuryl alcohol | 0.3 |

EXAMPLE 2

The procedure of Example 1 was repeated using a 15-mil sheet of the copolymer. The results of a series of tests are given in Table 2.

Table 2

| Bonding Agent | Peel Strength (lbs./in.) |
| --- | --- |
| epibromohydrin | > 24 |
| 4-butyrolactone | 29 |
| 1,3-dioxolane | 12.1 |
| 3-methoxy propionitrile | 15 |

EXAMPLE 3

The procedure of Example 1 was repeated using an extruded sheet of a copolymer of 75 parts of acrylonitrile and 25 parts of styrene prepared in the presence of a rubbery copolymer of styrene and butadiene. The sheet had a thickness of 5 mils. The results of a series of tests are given in Table 3.

Table 3

| Bonding Agent | Peel Strength (lbs./in.) |
| --- | --- |
| methyl furylketone | 6.0 |
| 4-valerolactone | * |
| 1,3-dioxolane | * |
| epichlorohydrin | * |
| ethylene oxide | * |
| 2-furaldehyde | * |
| 3-methoxy propionitrile | * |
| propylene oxide | * |

*The strength of the bond exceeded the strength of the sheet material.

We claim:

1. The method for bonding together surfaces of a high acrylonitrile copolymer comprising treating at least one of the surfaces with an organic solvent bonding agent and then bringing the surfaces in contact with one another wherein the high acrylonitrile copolymer is one prepared by the polymerization of 100 parts by weight of (A) from 60 to 90% by weight of at least one nitrile having the structure $$CH_2=C-CN$$
$$\phantom{CH_2=C-}|$$
$$\phantom{CH_2=C-}R$$

wherein R is hydrogen, a lower alkyl group having from 1 to 4 carbon atoms, or a halogen, and (B) from 10 to 40% by weight based on the combined weight of (A) plus (B) of at least one member selected from the group consisting of (1) styrene,
(2) an ester having the structure $$CH_2=C-COOR_2$$
$$\phantom{CH_2=C-}|$$
$$\phantom{CH_2=C-}R_1$$

wherein $R_1$ is hydrogen, an alkyl group having from 1 to 4 carbon atoms, or a halogen, and $R_2$ is an alkyl group having from 1 to 6 carbon atoms, (3) an alpha-olefin having the structure $$\phantom{CH_2=}R'$$
$$\phantom{CH_2=}|$$
$$CH_2=C$$
$$\phantom{CH_2=}|$$
$$\phantom{CH_2=}R''$$

wherein R' and R'' are alkyl groups having from 1 to 7 carbon atoms, (4) a vinyl ether selected from the group consisting of methyl vinyl ether, ethyl vinyl ether, the propyl vinyl ethers, and the butyl vinyl ethers,
(5) vinyl acetate, and
(6) indene, in the presence of from 0 to 40 parts by weight of (C) a rubbery polymer of a conjugated diene monomer selected from the group consisting of butadiene and isoprene and optionally at least one comonomer selected from the group consisting of styrene, a nitrile monomer having the structure $$CH_2=C-CN$$
$$\phantom{CH_2=C-}|$$
$$\phantom{CH_2=C-}R$$

wherein R has the foregoing designation, and an ester having the structure $$CH_2=C-COOR_2$$
$$\phantom{CH_2=C-}|$$
$$\phantom{CH_2=C-}R_1$$

wherein $R_1$ and $R_2$ have the foregoing designations, said rubbery polymer containing from 50 to 100% by weight of polymerized conjugated diene and from 0 to 50% by weight of comonomer wherein the bonding agent is selected from the group consisting of ethylene oxide, propylene oxide, epichlorohydrin, epibromohydrin, 2-furaldehyde, methyl furylketone, oxazole, 1,3-dioxolane, and 3-methoxy propionitrile.

2. The method of claim 1 wherein (A) is acrylonitrile.
3. The method of claim 2 wherein (B) is methyl acrylate.
4. The method of claim 3 wherein (C) is a rubbery copolymer of butadiene and acrylonitrile.
5. The method of claim 4 wherein the bonding agent is ethylene oxide.
6. The method of claim 4 wherein the bonding agent is epichlorohydrin.
7. The method of claim 4 wherein the bonding agent is propylene oxide.

* * * * *